United States Patent
Kuo et al.

(10) Patent No.: US 12,160,130 B2
(45) Date of Patent: Dec. 3, 2024

(54) POWER SUPPLY SYSTEM FOR PREVENTING BATTERY PACKS CONNECTED IN PARALLEL FROM CHARGING EACH OTHER

(71) Applicant: C-TECH UNITED CORPORATION, New Taipei (TW)

(72) Inventors: Heng-Chen Kuo, New Taipei (TW); Sheng-Hung Chu, New Taipei (TW)

(73) Assignee: C-TECH UNITED CORPORATION, New Taipei (TW)

( * ) Notice: Subject to any disclaimer, the term of this patent is extended or adjusted under 35 U.S.C. 154(b) by 508 days.

(21) Appl. No.: 17/541,665

(22) Filed: Dec. 3, 2021

(65) Prior Publication Data
US 2022/0393497 A1 Dec. 8, 2022

(30) Foreign Application Priority Data
Jun. 3, 2021 (TW) .................................. 110120117

(51) Int. Cl.
*H02J 7/00* (2006.01)
*H01M 10/44* (2006.01)
(Continued)

(52) U.S. Cl.
CPC ....... *H02J 7/00714* (2020.01); *H01M 10/441* (2013.01); *H01M 10/46* (2013.01);
(Continued)

(58) Field of Classification Search
CPC .... H02J 7/00714; H02J 7/0013; H02J 7/0047; H02J 7/0063; H02J 7/0031; H02J 1/10;
(Continued)

(56) References Cited

U.S. PATENT DOCUMENTS 7,436,149 B2 * 10/2008 Luo .................. G06F 1/263
320/115
2009/0295334 A1 * 12/2009 Yang ................ H02J 7/007182
320/152
(Continued)

FOREIGN PATENT DOCUMENTS

JP       2005323483 A   * 11/2005

OTHER PUBLICATIONS

Sabah, N.H. (2007). Electric Circuits and Signals (1st ed.). CRC Press. https://doi.org/10.1201/9781315219868 (Year: 2007).*
Machine translation of JP2005323483A (Year: 2005).*

*Primary Examiner* — Drew A Dunn
*Assistant Examiner* — Atm M Rahman
(74) *Attorney, Agent, or Firm* — Li & Cai Intellectual Property (USA) Office (57) ABSTRACT

A power supply system for preventing battery packs connected in parallel from charging each other is provided. Each of a plurality of battery packs includes a plurality of batteries, a sensing resistor, a detector circuit, a discharging transistor, a charging transistor, and a controller circuit. The sensing resistor has a first end connected to a negative terminal of the battery packs and a second end connected to a negative electrode of the battery circuit. The detector circuit is connected to the first end and the second end of the sensing resistor. The discharging transistor has a first end connected to a positive terminal of the battery packs and a second end connected to a first end of the charging transistor. According to a current of the sensing resistor, the controller circuit controls the discharging transistor and the charging transistor to be turned on or off.

8 Claims, 5 Drawing Sheets

(51) Int. Cl.
*H01M 10/46* (2006.01)
*H01M 10/48* (2006.01)
*H01M 50/509* (2021.01)

(52) U.S. Cl.
CPC ....... *H01M 10/482* (2013.01); *H01M 50/509* (2021.01); *H02J 7/0013* (2013.01); *H02J 7/0047* (2013.01)

(58) Field of Classification Search
CPC .. H01M 10/441; H01M 10/46; H01M 10/482; H01M 50/509; H01M 2010/4271; H01M 10/425; H01M 50/204; H01M 50/512; H01M 50/569; H01M 50/572; Y02E 60/10
See application file for complete search history.

(56) References Cited

U.S. PATENT DOCUMENTS

2014/0203780 A1\* 7/2014 Hu ..................... H02J 7/0013
 320/112
2018/0034288 A1\* 2/2018 Greening ............. H02J 7/0029

\* cited by examiner

POWER SUPPLY SYSTEM FOR PREVENTING BATTERY PACKS CONNECTED IN PARALLEL FROM CHARGING EACH OTHER

CROSS-REFERENCE TO RELATED PATENT APPLICATION

This application claims the benefit of priority to Taiwan Patent Application No. 110120117, filed on Jun. 3, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power supply system, and more particularly to a power supply system for preventing battery packs connected in parallel from charging each other.

BACKGROUND OF THE DISCLOSURE

An uninterruptible power system usually uses a parallel circuit of a plurality of battery packs. For example, thirty two or more of the battery packs can be connected in parallel. When a quantity of the battery packs connected in parallel increases, an overall system capacity can be increased. Since different battery packs have different power sources, voltages of the battery packs may be different from each other. For example, a part of the battery packs may be fully charged, while another part of the battery packs may be under-charged. Furthermore, even when all the battery packs are fully charged, the battery packs may have different voltages due to different material characteristics (e.g., lithium ternary/lithium iron). In a situation where there is a voltage difference between the battery packs, a large current generated by the battery packs having a high voltage will recharge the battery packs having a low voltage, which can result in damage to switching elements in the battery packs with a lower withstand voltage.

Before using the parallel circuit of the battery packs, each of the battery packs needs to be charged by an additional charging device to the extent of obtaining the same voltage, or the battery packs having the same capacity are charged to full charge, so as to prevent a part of the battery packs from being damaged. However, the above process is very burdensome.

In order to solve the above-mentioned problems, each of the battery packs is usually connected in series with an additional diode or a circuit element with unidirectional conduction characteristics, thereby preventing a part of the battery packs from being damaged. However, each of the diodes has a forward voltage drop. The diodes of different materials have different forward voltage drops. For example, the forward voltage drop of a commonly used silicon diode is about 0.6 V to 0.7 V, and the forward voltage drop of a germanium diode is about 0.2 V to 0.3 V.

It should be understood that power consumption can be calculated by multiplying a voltage value by a current value. When a large quantity of the battery packs used in the uninterruptible power system is connected in parallel with a large quantity of the diodes, a large amount of additional power consumption can occur. When the quantity of the battery packs connected in parallel increases, a quantity of the diodes also increases and the additional power consumption becomes greater, thereby generating a lot of extra heat and significantly reducing the power supply performance of the uninterruptible power system. In addition, a large quantity of the diodes and heat dissipation components will occupy an internal space of the uninterruptible power system.

SUMMARY OF THE DISCLOSURE

In response to the above-referenced technical inadequacies, the present disclosure provides a power supply system for preventing battery packs connected in parallel from charging each other. The power supply system includes a plurality of battery packs. The battery packs are connected in parallel to each other. Each of the battery packs has a negative terminal and a positive terminal, and includes a battery circuit, a sensing resistor, a detector circuit, a discharging transistor, a charging transistor, and a controller circuit. The battery circuit includes a plurality of batteries connected in series to each other. A first end of the sensing resistor is connected to the negative terminal, and a second end of the sensing resistor is connected to a negative electrode of the battery circuit. The detector circuit is connected to the first end and the second end of the sensing resistor. The detector circuit is configured to output a current detection signal by detecting whether a discharge current of the battery circuit flows through the sensing resistor. A first end of the discharging transistor is connected to the positive terminal and an anode electrode of a first internal diode of the discharging transistor. A second end of the discharging transistor is connected to a cathode of the first internal diode. A first end of the charging transistor is connected to the second end of the discharging transistor and a cathode of a second internal diode of the charging transistor. A second end of the charging transistor is connected to a positive electrode of the battery circuit. The controller circuit is connected to the detector circuit, a control terminal of the discharging transistor, and a control terminal of the charging transistor. When the current detection signal received by the controller circuit from the detector circuit indicates that the discharge current of the battery circuit does not flow through the sensing resistor, the controller circuit turns on the discharging transistor and turns off the charging transistor. The positive terminal of each of the battery packs is not connected to an extra diode located outside of the battery packs.

In certain embodiments, when the current detection signal received by the controller circuit indicates that the discharge current flows through the sensing resistor, the controller circuit keeps the discharging transistor turned on, and turns on the charging transistor.

In certain embodiments, in response to the controller circuit determining, according to the current detection signal, that the detector circuit detects a current flowing through the sensing resistor and being greater than a current threshold, the controller circuit determines that the current is the discharge current of the battery circuit and turns on the discharging transistor and the charging transistor.

In certain embodiments, in response to the controller circuit determining that, according to the current detection signal, the detector circuit does not detect the current flowing through the sensing resistor or detects the current flowing through the sensing resistor to be less than or equal to the current threshold, the controller circuit turns on the discharging transistor and turns off the charging transistor.

In certain embodiments, the controller circuit is configured to obtain a voltage of the sensing resistor by multiplying a resistance of the sensing resistor by the discharge current, so as to determine whether the battery circuit is discharging.

In certain embodiments, in each of the battery packs, the controller circuit is connected to the positive terminal and the negative terminal of the battery pack so as to obtain a voltage of the positive terminal and a voltage of the negative terminal. In each of the battery packs, the controller circuit is configured to calculate a voltage difference between the voltage of the positive terminal and the voltage of the negative terminal so as to determine a state of the battery circuit according to the voltage difference.

In certain embodiments, when the power supply system is in a standby mode, the battery circuit does not discharge, and the controller circuit turns on the discharging transistor and turns off the charging transistor.

In certain embodiments, each of the battery packs has a same capacity.

In certain embodiments, each of the battery packs has a different capacity.

Therefore, in the power supply system for preventing battery packs connected in parallel from charging each other provided by the present disclosure, through "each of the battery packs connected in parallel being not connected to the extra diode", additional power consumption and heat caused by a forward voltage drop of the extra diode can be prevented and the efficiency of the power supply system can be improved. In the present disclosure, the detector circuit detects whether the discharge current of the battery flows through the sensing resistor to determine whether the battery packs are being discharged, and the charging transistor and the discharging transistor can be controlled to be turned on or off. In this way, the battery packs can be prevented from charging each other, so as to avoid causing damage to low voltage circuit components when charged by a high current.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
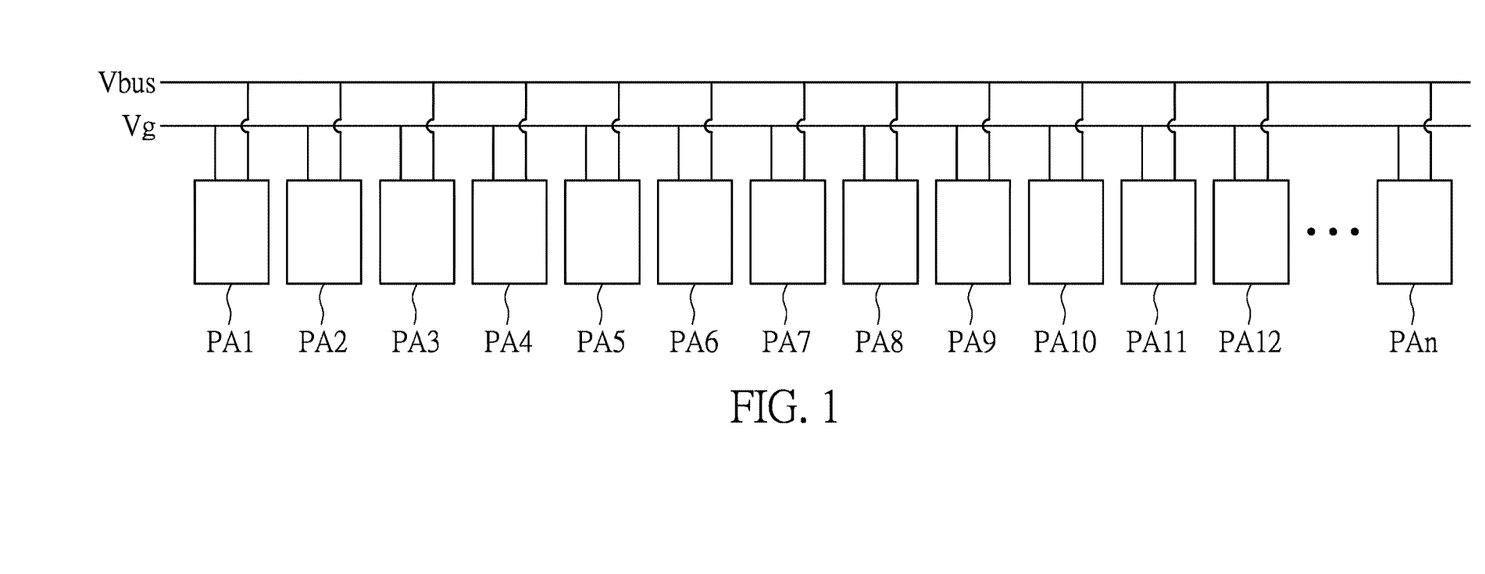
FIG. 1 is a schematic circuit diagram of a power supply system for preventing battery packs connected in parallel from charging each other according to the present disclosure.
Figure 2:
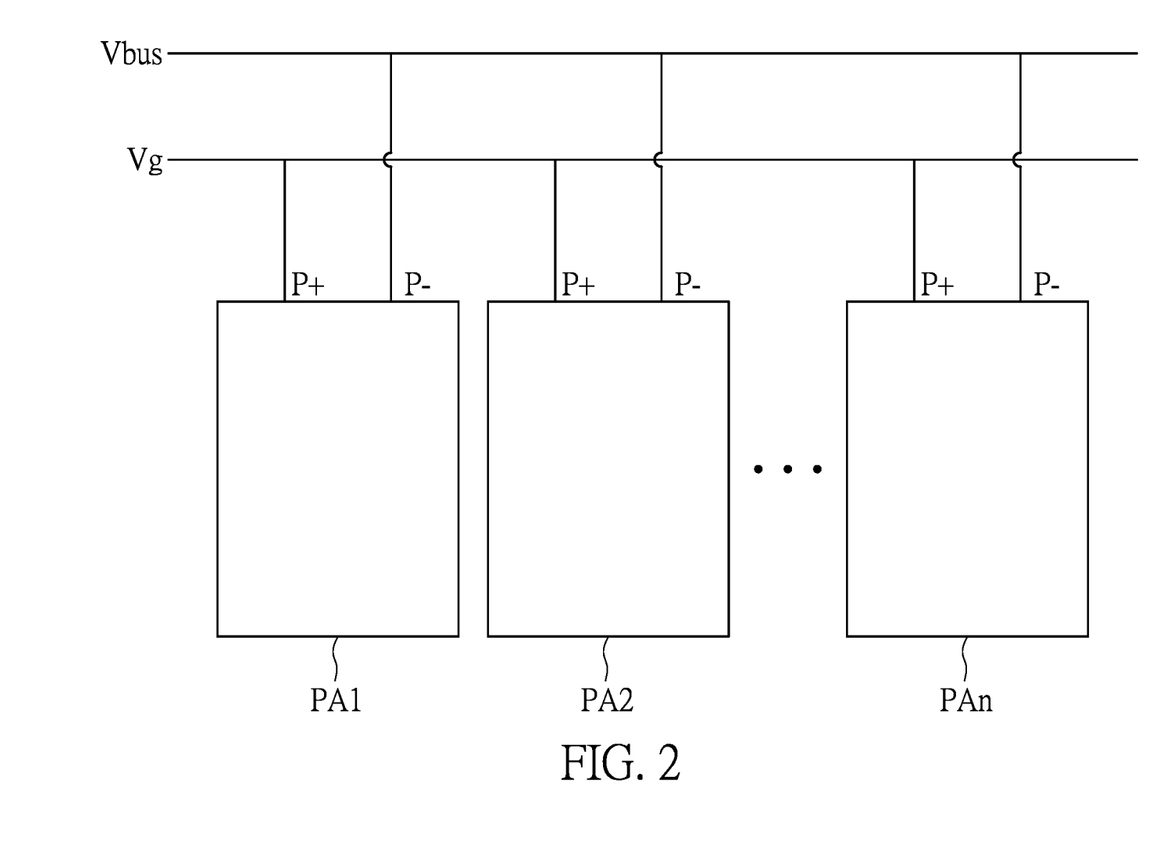
FIG. 2 is a schematic circuit diagram of a plurality of battery packs of the power supply system for preventing battery packs connected in parallel from charging each other according to the present disclosure.
Figure 3:
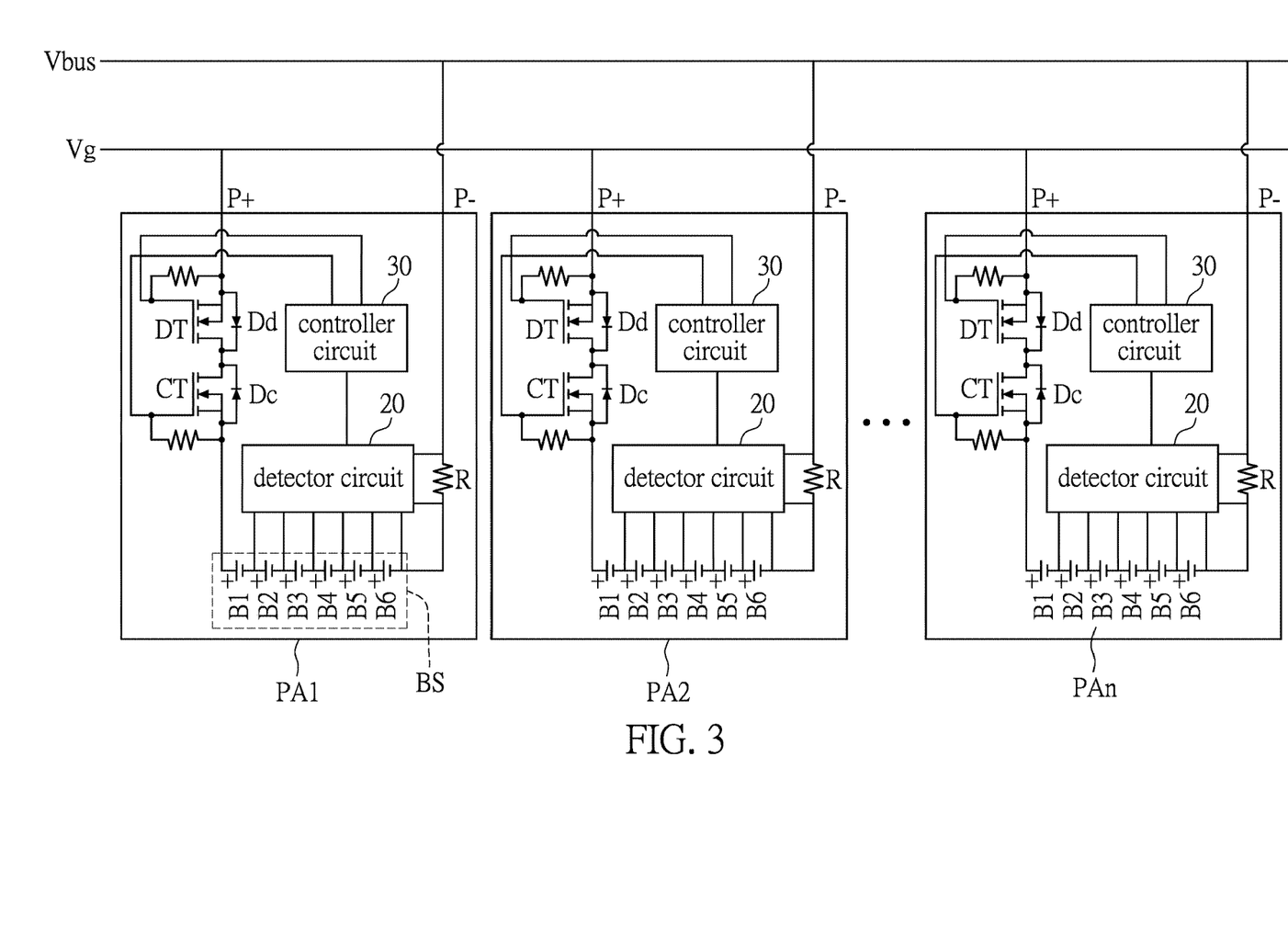
FIG. 3 is a schematic circuit diagram of an interior of the battery packs of the power supply system for preventing battery packs connected in parallel from charging each other according to the present disclosure.
Figure 4:
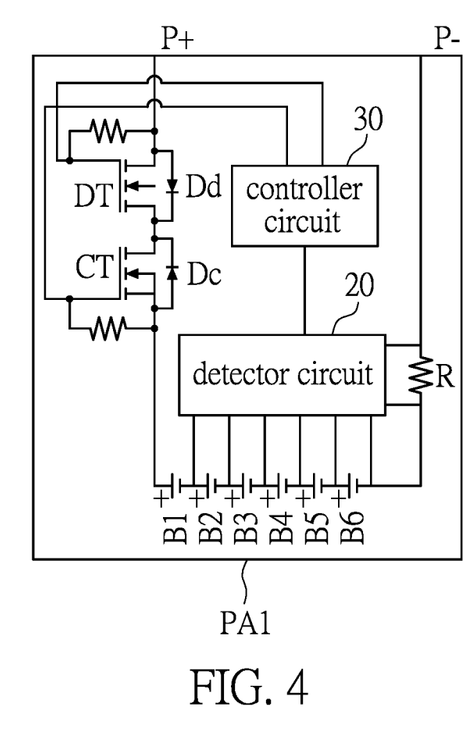
FIG. 4 is a schematic circuit diagram of an interior of one of the battery packs of the power supply system for preventing battery packs connected in parallel from charging each other according to the present disclosure.
Figure 5:
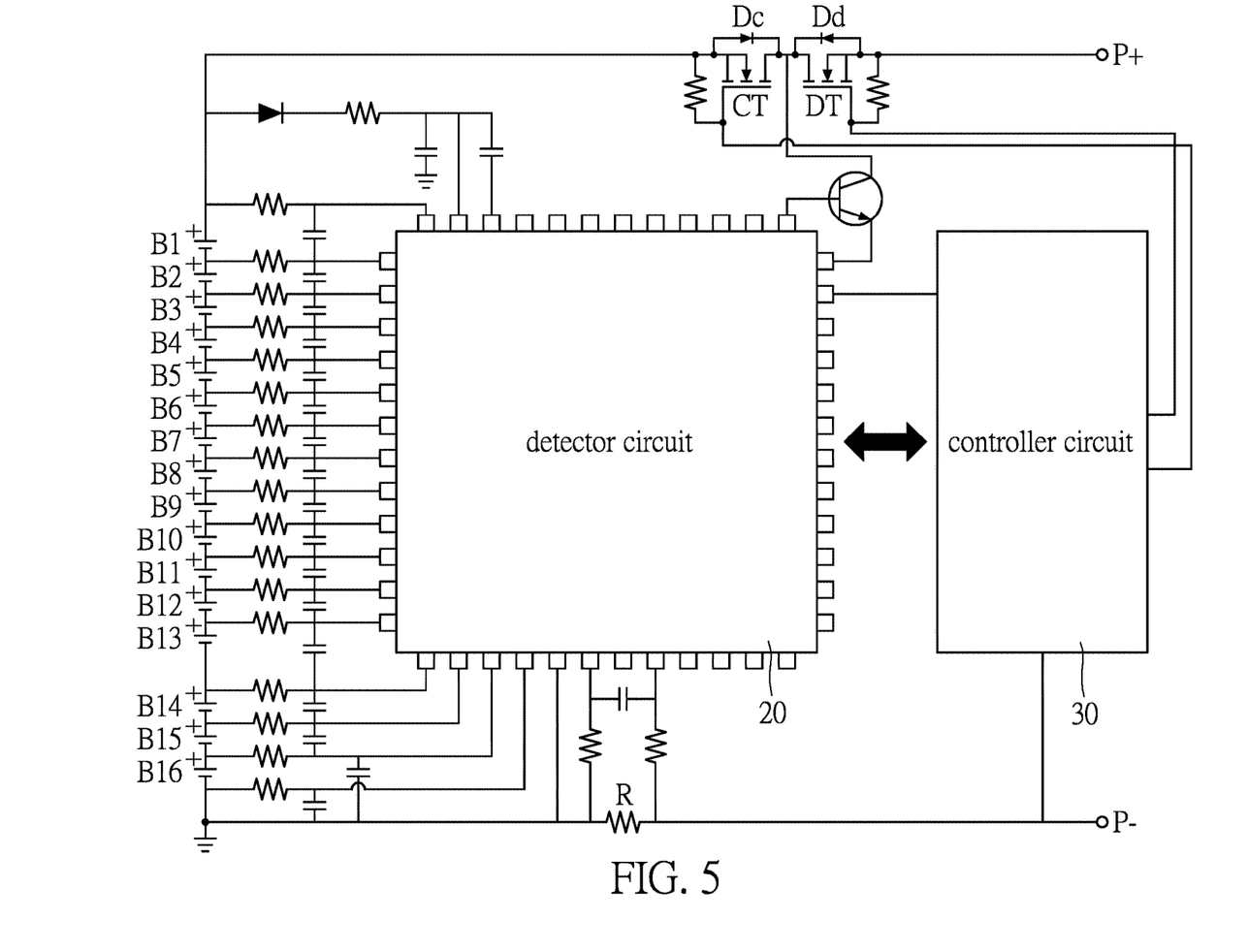
FIG. 5 is a schematic circuit diagram of another interior of one of the battery packs of the power supply system for preventing battery packs connected in parallel from charging each other according to the present disclosure.

Referring to FIG. 1 to FIG. 5, FIG. 1 is a schematic circuit diagram of a power supply system for preventing battery packs connected in parallel from charging each other according to the present disclosure, FIG. 2 is a schematic circuit diagram of a plurality of battery packs of the power supply system for preventing battery packs connected in parallel from charging each other according to the present disclosure, FIG. 3 is a schematic circuit diagram of an interior of the battery packs of the power supply system for preventing battery packs connected in parallel from charging each other according to the present disclosure, and FIG. 4 and FIG. 5 are each a schematic circuit diagram of an interior of one of the battery packs of the power supply system for preventing battery packs connected in parallel from charging each other according to the present disclosure.

Referring to FIG. 1 and FIG. 2, in an uninterruptible power system or other power supply systems, a quantity of a plurality of battery packs PA1~PAn is n (where n is an integer value greater than 1), and the battery packs PA1~PAn can be connected in parallel to each other. The quantity of the battery packs PA1~PAn can depend on the actual power demand. Each of the battery packs PA1~PAn can have a positive terminal P+ and a negative terminal P−. A capacity of each of the battery packs PA1~PAn may be the same or different from one another.

Referring to FIG. 3 to FIG. 5, each of the battery packs PA1~PAn includes a battery circuit BS, a sensing resistor R, a discharging transistor DT, a charging transistor CT, a detector circuit 20, and a controller circuit 30.

Referring to FIG. 4, the battery circuit BS in each of the battery packs PA1~PAn can include a plurality of batteries B1~B6 connected in series to each other. Referring to FIG. 5, the battery circuit BS in each of the battery packs PA1~PAn can include a plurality of batteries B1~B16 connected in series to each other. The batteries B1~B6 can be lithium batteries or batteries made of other materials. It should be understood that types and quantities of the batteries provided in the present embodiment are only examples, and the present embodiment is not limited thereto. In practice, the types and quantities of the batteries can be adjusted according to requirements.

A first end (e.g., source) of the discharging transistor DT can be connected to the positive terminal P+ of the battery pack and an anode of a first internal diode Dd of the discharging transistor DT. A second end (e.g., drain) of the discharging transistor DT can be connected to a cathode of the first internal diode Dd. A control terminal (e.g., gate) of the discharging transistor DT can be connected to the controller circuit 30.

A first end (e.g., drain) of the charging transistor CT can be connected to the second end of the discharging transistor DT and a cathode of a second internal diode Dc of the charging transistor CT. A second end (e.g., source) of the charging transistor CT can be connected to an anode of the second internal diode Dc. In addition, the second end of the charging transistor CT can be connected to a positive electrode of the battery circuit BS, that is, a positive electrode of the battery B1. A control terminal (e.g., gate) of the charging transistor CT can be connected to the controller circuit 30.

The following description describes the battery pack PA1, and other battery packs PA2~PAn perform the same or similar operations as the battery pack PAL In the battery pack PA1, the detector circuit 20 can be connected to one end of each of the batteries B1~B6 (e.g., a negative electrode of each of the batteries B1~B6), and be connected to a first end and a second end of the sensing resistor R. In addition, the first end of the sensing resistor R of the battery pack PA1 can be connected to the negative terminal P− of the battery pack PAL The second end of the sensing resistor R can be connected to the negative electrode of the battery circuit BS, that is, the negative electrode of the battery B6.

It is worth noting that the positive terminal P+ and the negative terminal P− of the battery pack PA1 of the present embodiment are not connected to an extra diode located outside of the battery pack PA1, but are configured to implement a recharge prevention mechanism, so as to prevent the discharge current of the battery packs PA1~PAn connected in parallel from charging each other. The specific description is as follows.

The detector circuit 20 can output a current detection signal by detecting whether a discharge current of the battery circuit BS flows through the sensing resistor R. The controller circuit 30 can be connected to the detector circuit 20, a control terminal of the discharging transistor DT, and a control terminal of the charging transistor CT. The controller circuit 30 can receive the current detection signal from the detector circuit 20.

It is worth noting that when the current detection signal received by the controller circuit 30 from the detector circuit 20 indicates that the discharge current of the battery circuit BS does not flow through the sensing resistor R, the controller circuit 30 determines that the battery circuit BS is not being discharged. Accordingly, the control circuit 30 infers that the power supply system of the present embodiment may be in a standby mode (the power supply system is not powered), or the battery pack PA1 is not powered but one or more of the battery packs PA2~PAn are supplying power. In this case, the control circuit 30 of the battery pack PA1 keeps the discharging transistor DT of the battery pack PA1 turned on and turns off the charging transistor CT of the battery pack PA1.

Conversely, when the current detection signal received by the controller circuit 30 from the detector circuit 20 indicates that the discharge current of the battery circuit BS flows through the sensing resistor R, the controller circuit 30 determines that the battery circuit BS is being discharged. The controller circuit 30 turns on the discharging transistor DT (or keeps the discharging transistor DT turned on), and turns on the charging transistor CT.

More precisely, in response to the controller circuit 30 determining, according to the current detection signal, that the detector circuit 20 does not detect any current flowing through the sensing resistor R or detects the current flowing through the sensing resistor R and to be less than or equal to a current threshold, the controller circuit 30 keeps the discharging transistor DT turned on and turns off the charging transistor CT.

Conversely, in response to the controller circuit 30 of the battery pack PA1 determining, according to the current detection signal, that the current flowing through the sensing resistor R of the battery pack PA1 and is greater than the current threshold, the controller circuit 30 determines that the current flowing through the sensing resistor R is the discharge current of the battery circuit BS of the battery pack PA1 and turns on the charging transistor CT. The controller circuit 30 turns on the discharging transistor DT (or keeps the discharging transistor DT turned on).

In practice, the discharging transistor DT can always be turned on.

It should be understood that when both of the charging transistor CT and the discharging transistor DT are turned on, the current will not flow through the first internal diode Dd and the second internal diode Dc. Therefore, additional power consumption and heat will not be caused by forward voltage drops of the first internal diode Dd and the second internal diode Dc.

When the discharging transistor DT of the battery pack PA1 is turned on and the charging transistor CT of the battery pack PA1 is turned off, the discharge current of the battery packs PA2~PAn cannot flow from the first end of the charging transistor CT of the battery pack PA1 to the second end of the charging transistor CT. Due to unidirectional conduction characteristics of the first internal diode Dd, the discharge current of the battery packs PA2~PAn cannot flow from the first internal diode Dd to the battery circuit BS. Therefore, the previous configuration can prevent the discharge current of the battery packs PA2~PAn from charging the battery pack PA1, so as not to cause damage to internal circuit components of the battery pack PA1 or affect the operation of the battery pack PA1.

If necessary, the control circuit 30 can obtain a voltage of the sensing resistor R by multiplying a resistance of the sensing resistor R by the discharge current flowing through the sensing resistor R, and determine whether the battery circuit BS is in a discharging state according to the voltage of the sensing resistor R.

In addition, the control circuit 30 can be connected to the positive terminal P+ and the negative terminal P− of the battery pack PA1, so as to obtain a voltage Vg of the positive terminal P+ and a voltage Vbus of the negative terminal P−. The controller circuit 30 can calculate a voltage difference between the voltage Vg of the positive terminal P+ and the voltage Vbus of the negative terminal P−, so as to determine a state of the battery circuit BS according to the voltage difference.

Beneficial Effects of the Embodiment

Therefore, in the power supply system for preventing battery packs connected in parallel from charging each other provided by the present disclosure, through "each of the battery packs connected in parallel being not connected to the extra diode", additional power consumption and heat caused by a forward voltage drop of the extra diode can be prevented and the efficiency of the power supply system can be improved. In the present disclosure, the detector circuit detects whether the discharge current of the battery flows through the sensing resistor to determine whether the battery packs are being discharged, and the charging transistor and the discharging transistor can be controlled to be turned on or off. In this way, the battery packs can be prevented from charging each other, so as to avoid causing damage to low voltage circuit components when charged by a high current.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply system for preventing battery packs connected in parallel from charging each other, the power supply system comprising:
   a plurality of battery packs connected in parallel to each other, wherein each of the battery packs has a negative terminal and a positive terminal, and includes:
   a battery circuit including a plurality of batteries connected in series to each other;
   a sensing resistor, wherein a first end of the sensing resistor is connected to the negative terminal, and a second end of the sensing resistor is connected to a negative electrode of the battery circuit;
   a detector circuit connected to the first end and the second end of the sensing resistor, wherein the detector circuit is configured to output a current detection signal by detecting whether a discharge current of the battery circuit flows through the sensing resistor;
   a discharging transistor, wherein a first end of the discharging transistor is connected to the positive terminal and an anode of a first internal diode of the discharging transistor, and wherein a second end of the discharging transistor is connected to a cathode of the first internal diode;
   a charging transistor, wherein a first end of the charging transistor is connected to the second end of the discharging transistor and a cathode of a second internal diode of the charging transistor, and wherein a second end of the charging transistor is connected to a positive electrode of the battery circuit; and
   a controller circuit connected to the detector circuit, a control terminal of the discharging transistor, and a control terminal of the charging transistor, wherein, when the current detection signal received by the controller circuit from the detector circuit indicates that the discharge current of the battery circuit does not flow through the sensing resistor, the controller circuit turns on the discharging transistor and turns off the charging transistor;
   wherein the positive terminal of each of the battery packs is not connected to an extra diode located outside of the battery packs;
   wherein, when the current detection signal received by the controller circuit indicates that the discharge current flows through the sensing resistor, the controller circuit keeps the discharging transistor turned on, and turns on the charging transistor.

2. The power supply system according to claim 1, wherein, in response to the controller circuit determining, according to the current detection signal, that the detector circuit detects a current flowing through the sensing resistor and being greater than a current threshold, the controller circuit determines that the current is the discharge current of the battery circuit and turns on the discharging transistor and the charging transistor.

3. The power supply system according to claim 2, wherein, in response to the controller circuit determining, according to the current detection signal, that the detector circuit does not detect the current flowing through the sensing resistor or detects the current flowing through the sensing resistor to be less than or equal to the current threshold, the controller circuit turns on the discharging transistor and turns off the charging transistor.

4. The power supply system according to claim 1, wherein the controller circuit is configured to obtain a voltage of the sensing resistor by multiplying a resistance of the sensing resistor by the discharge current, so as to determine whether the battery circuit is discharging.

5. The power supply system according to claim 1, wherein, in each of the battery packs, the controller circuit is connected to the positive terminal and the negative terminal of the battery pack, so as to obtain a voltage of the positive terminal and a voltage of the negative terminal; wherein, in each of the battery packs, the controller circuit is configured to calculate a voltage difference between the voltage of the positive terminal and the voltage of the negative terminal, so as to determine a state of the battery circuit according to the voltage difference.

6. The power supply system according to claim 1, wherein, when the power supply system is in a standby mode, the battery circuit does not discharge, and the controller circuit turns on the discharging transistor and turns off the charging transistor.

7. The power supply system according to claim 1, wherein the battery packs have a same capacity.

8. The power supply system according to claim 1, wherein the battery packs have different capacities.

\* \* \* \* \*